United States Patent Office 3,160,406
Patented Dec. 8, 1964

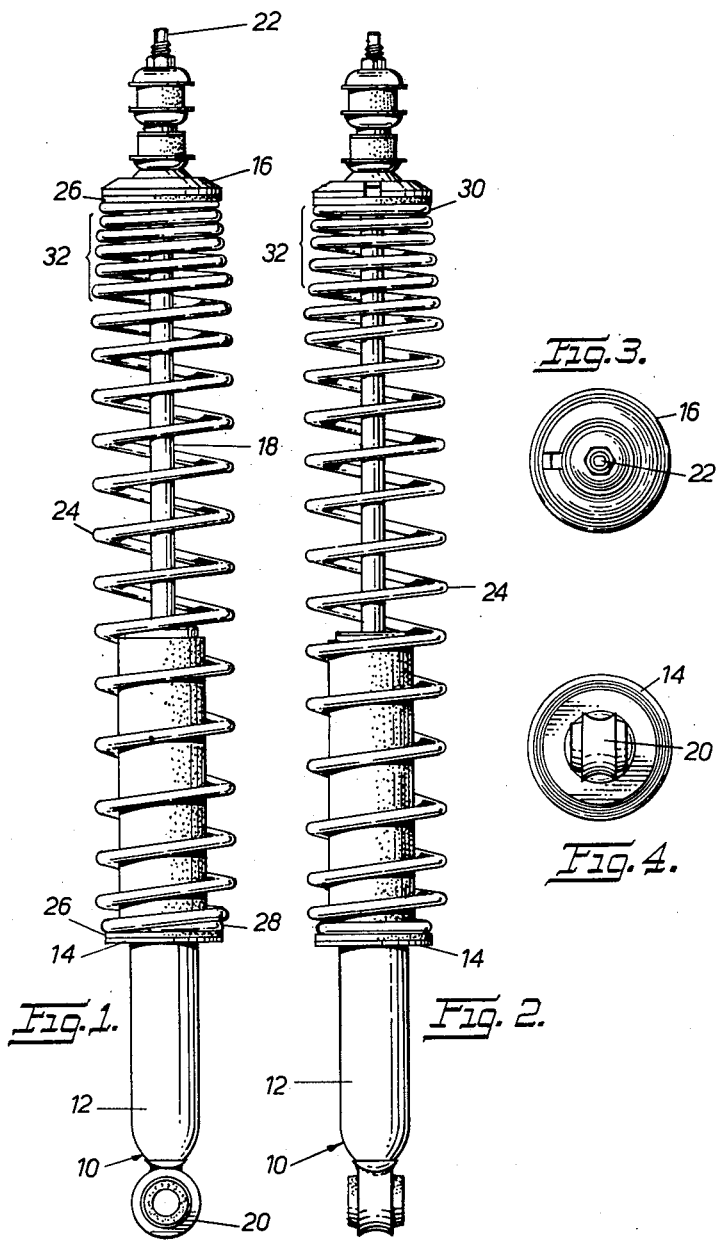

3,160,406
VEHICLE SUSPENSIONS
Ronald Sidney Dickinson, Osbaldwick, York, England, assignor to Armstrong Patents Co. Limited, London, England, a British company
Filed Jan. 8, 1963, Ser. No. 250,183
2 Claims. (Cl. 267—8)

This invention concerns vehicle suspensions, and relates more especially to suspension units of the type comprising a telescopic hydraulic shock absorber in combination with a coil suspension spring carried coaxially by said shock absorber.

In circumstances where a vehicle suspension already incorporating telescopic shock absorbers proves unsatisfactory in use, for example because it is too soft for the load conditions which it experiences, then combined suspension units of the foregoing type are useful in enabling the vehicle suspension to be stiffened or otherwise modified without major structural changes, simply by directly replacing the existing shock absorbers by such suspension units, the coil spring and damping characteristics of which can be predetermined to impart the required modification to the vehicle suspension. Usually, if fitting problems are to be avoided, the diameter of the coil spring must be kept as small as possible, while for the same reason, together with considerations of weight and economy, the size of the wire from which the spring is wound must be the smallest practicable. Under these conditions, however, a poor length/diameter ratio of the spring may result, with the consequence that in use, the spring readily bends when under compression, and, apart from the unfavourable spring characteristic which this gives, the spring then becomes liable to set up severe rattling against the shock absorber body.

It is a principal object of the present invention to provide a suspension unit of the type described, in which the theoretically predictable spring characteristic is substantially maintained in practice, and in which the coil spring is designed to minimise the possibility of rattling against the shock absorber body.

Another object of the invention is to provide a suspension unit having optimum physical dimensions of the spring and shock absorber, more especially at the regions which adjoin the fitting points provided for a shock absorber on the vehicle.

A still further object of the invention is to impart a progressive characteristic to the spring of the unit under compressive conditions.

With these and other objects in view, the present invention accordingly provides a vehicle suspension unit of the type described, in which the spring has at least its end turns of lesser diameter than its intermediate turns and conforming closely with the cylindrical periphery of the shock absorber.

In this way, the end turns of the spring may be kept to a minimum diameter, conforming closely to the external diameter of the shock absorber itself and avoiding problems in mounting the unit which can arise when the spring ends are of greater diameter. At the same time, the spring shape resulting from the smaller diameter end turns appears to encourage compressive forces applied to the spring to remain more accurately axially directed, thereby avoidng unwanted bending of the spring away from its axis, and permits even the spring turns intermediate the reduced diameter end turns to be of rather smaller diameter than would be the case in the absence of said reduced end turns.

According to another feature of the invention, some of the turns of the spring, at least at one end thereof, are of progressively decreasing pitch towards said end. Such variable pitch not only imparts a progressive characteristic to the spring, but also assists in maintaining the spring rigid to further resist bowing thereof.

The invention will be described further, by way of example, with reference to the accompanying drawings, in which:

FIG. 1 is a side elevation of a vehicle suspension unit embodying the invention;
FIG. 2 is a similar elevation, but with the unit moved through 90° relative to FIG. 1;
FIG. 3 is a view of one end of the unit; and
FIG. 4 is a view of the opposite end.

As shown in the drawings, the suspension unit comprises a telescopic hydraulic shock absorber 10, which may be of any convenient conventional nature, but which in common with all such shock absorbers comprises a piston working in a pressure cylinder containing a hydraulic medium, and fluid flow restricting means (usually valve means) for determining the degree of resistance offered to piston movements in opposite directions in the cylinder. Usually, a hydraulic reservoir is provided to communicate with the pressure cylinder, and may conveniently comprise a reservoir cylinder in spaced, coaxial relation around the pressure cylinder. Such a reservoir cylinder is indicated at 12 in FIGS. 1 and 2. However, such shock absorbers are well understood in the art, as shown for example in U.S. Patent No. 2,672,952, and render further description thereof unnecessary in relation to the present invention.

The reservoir cylinder 12 carries a fixed annular abutment 14, and a similar abutment 16 is carried on the piston 18 which extends in conventional manner from the pressure cylinder of the shock absorber. The free end of the cylinder 12 carries a mounting eye 20 for attaching the unit to a suitable part of a vehicle, and the piston rod 18 has a threaded stud end 22 for attaching the free end of the piston rod to a second part of the vehicle which is movable relative to said first part. Between the abutments is located a coil spring 24 which, at each end, is seated on an annular rubber pad or washer 26 introduced between said end and the adjoining abutment.

It will be noted that, at each end of the spring, at least the endmost turn of the spring is of reduced diameter relative to the spring turns intermediate the ends. Thus, the end turn 28 at the lower end of the spring (as viewed in the drawings) and the end turn 30 at the upper end of the spring are of reduced diameter relative to the turns at the central and adjacent regions of the spring. In fact, at the upper end of the spring, both the end turn 30 and several of the turns which adjoin it are of reduced diameter, but each progressively increasing in diameter in a direction towards the centre of the spring, so that at its upper end the spring is slightly tapered. These latter, progressively increasing-diameter turns are further of progressively increasing pitch in a direction towards the spring centre, as indicated at 32 in FIGS. 1 and 2.

By virtue of the reduced diameter end turns 28 and 30 of the spring, mounting problems which can otherwise arise when the suspension unit 10 is fitted to a vehicle, for example in place of the normal telescopic shock absorber, are avoided, more especially at the spring end adjoining the stud 22, since it follows that smaller abutments 14 and 16 can be employed and there is a general saving of valuable space, an important factor in vehicle engineering. At the same time, the end turns 28 and 30, assisted by the reduced but increasing-diameter turns 32, encourage compressive forces applied to the spring by the abutments 14 and 16 to remain axially directed, and thus discourage bowing of the spring. This effect is still further assisted by the varying pitch of the turns 32 which, in addition to establishing a desired spring characteristic having a progressive spring rate, maintain the spring rigidity in their region and resist bowing. The result of these several factors is that even the intermediate turns of the spring may be of rather lesser diameter than would otherwise be the case.

I claim:

1. In a vehicle suspension unit comprising a telescopic hydraulic shock absorber of generally cylindrical configuration and including a piston component telescopically engaged in and having one end projecting from a cylinder component, and a coil spring engaged on said shock absorber for compression and extension therewith, the improvement comprising a first spring abutment at the projecting end of the piston component, a second spring abutment intermediate the ends of the cylinder component, said coil spring being in compression and coaxially embracing the exterior of said shock absorber between said abutments, said spring comprising end turns each of a diameter closely conforming with the cylindrical periphery of said cylinder component and of a reduced diameter relative to the remaining spring turns, said spring having a maximum diameter at its central region and at regions on each side of said central region, and a plurality of further reduced diameter turns at least adjacent the end turn of said spring at said projecting end of said piston component, said further reduced diameter turns each progressively increasing in diameter in a direction towards the maximum diameter turns and progressively decreasing in pitch in a direction from said maximum diameter to the spring end at which said further turns are situated.

2. A vehicle suspension as set forth in claim 1, wherein an annular rubber pad is interposed between each abutment and the associated spring end.

References Cited by the Examiner

UNITED STATES PATENTS

| 1,154,996 | 9/15 | Malone | 267—8 |
| 2,509,803 | 5/50 | Booth | 267—20 X |
| 2,731,257 | 1/56 | Hansen | 267—8 |
| 2,889,144 | 6/59 | Walker | 267—8 |
| 2,896,938 | 7/59 | Walker | 267—8 |

FOREIGN PATENTS

| 1,069,215 | 2/54 | France. |

ARTHUR L. LA POINT, *Primary Examiner.*